United States Patent
Lambert et al.

(10) Patent No.: US 8,398,034 B2
(45) Date of Patent: Mar. 19, 2013

(54) PIPE SPACER

(75) Inventors: Patrick Lambert, Otterburn Park (CA); André D. Rotondo, Sorel-Tracy (CA); Nicolas Cotta, Montreal (CA); Jacques Rotondo, Beloeil (CA); Justin Carbonneau, St-Roch-de-Richelieu (CA); Alexandre St-Pierre, Montreal (CA)

(73) Assignee: Supranergie Inc., Otterburn Park (CA)

( * ) Notice: Subject to any disclaimer, the term of this patent is extended or adjusted under 35 U.S.C. 154(b) by 25 days.

(21) Appl. No.: 13/049,248

(22) Filed: Mar. 16, 2011

(65) Prior Publication Data

US 2011/0226911 A1   Sep. 22, 2011

Related U.S. Application Data

(60) Provisional application No. 61/314,224, filed on Mar. 16, 2010.

(51) Int. Cl.
*F16L 3/22* (2006.01)

(52) U.S. Cl. .................... 248/68.1; 248/65; 165/45

(58) Field of Classification Search ............ 248/67.7, 248/68.1, 74.2, 65, 49, 58, 60, 62, 231.81, 248/215, 317, 301–304, 74.1; 165/45, 162; 138/106; 294/170; 405/184.4; 166/241.1, 166/241.6, 242.3; 24/129 R, 115 A, 288, 24/546, 339; D8/372
See application file for complete search history.

(56) References Cited

U.S. PATENT DOCUMENTS

| | | | | |
|---|---|---|---|---|
| 429,357 | A * | 6/1890 | McBee | 248/68.1 |
| 722,956 | A * | 3/1903 | Doughty | 294/170 |
| 2,495,848 | A * | 1/1950 | Kiesel | 248/68.1 |
| 3,100,529 | A | 8/1963 | McStravick | |
| 3,136,515 | A * | 6/1964 | Potruch | 248/62 |
| 3,257,767 | A * | 6/1966 | Lassy | 52/649.8 |
| 3,485,467 | A * | 12/1969 | Fuchs et al. | 24/601.2 |
| 3,486,531 | A * | 12/1969 | Nalodka | 138/103 |
| 3,584,348 | A * | 6/1971 | Soltysik | 248/68.1 |
| 3,636,595 | A * | 1/1972 | Wines | 24/555 |
| 4,318,519 | A * | 3/1982 | Blevins | 248/79 |
| 4,450,605 | A * | 5/1984 | Schaty | 24/457 |
| 4,541,602 | A * | 9/1985 | Potzas | 248/544 |
| 4,657,069 | A * | 4/1987 | Easton | 165/76 |
| 4,715,429 | A | 12/1987 | Mogensen | |
| 4,979,712 | A * | 12/1990 | Rios | 248/215 |
| 5,056,198 | A * | 10/1991 | Viglione | 24/336 |
| 5,464,179 | A * | 11/1995 | Ruckwardt | 248/68.1 |
| 5,667,266 | A * | 9/1997 | Giocanti | 294/170 |
| 5,769,556 | A * | 6/1998 | Colley | 403/24 |
| 5,772,160 | A * | 6/1998 | Gordon | 248/68.1 |
| D406,918 | S * | 3/1999 | Yan | D26/138 |
| 5,896,892 | A | 4/1999 | Adamson | |
| D409,293 | S * | 5/1999 | Senninger | D23/265 |
| 6,000,459 | A | 12/1999 | Jeppesen | |
| 6,390,421 | B1 * | 5/2002 | Rudd | 248/68.1 |
| 6,470,881 | B1 | 10/2002 | Tiszai | |
| 6,499,781 | B1 * | 12/2002 | Flynn | 294/159 |
| 6,883,761 | B2 * | 4/2005 | Boon et al. | 248/74.1 |
| 6,899,310 | B1 * | 5/2005 | Trangsrud | 248/316.7 |
| D601,412 | S * | 10/2009 | Brown et al. | D8/395 |

FOREIGN PATENT DOCUMENTS

| | | |
|---|---|---|
| DE | 102007017078 | 11/2008 |
| DE | 202009009081 | 10/2009 |
| DE | 102009013981 | 9/2010 |
| EP | 0582118 | 2/1994 |
| EP | 0833115 | 4/1998 |
| EP | 2056040 | 5/2009 |

* cited by examiner

*Primary Examiner* — Terrell McKinnon
*Assistant Examiner* — Ingrid M Weinhold
(74) *Attorney, Agent, or Firm* — Benoît & Côté

(57) ABSTRACT

A pipe spacer is provided for spacing at least one pipe in a piping system. The spacer includes a handle with at least one pipe-engaging support member for maintaining an engaged pipe close to a surface in a piping system.

10 Claims, 10 Drawing Sheets

| Bore Hole (po) | Pipe Size (po) | Nominal⌀ (mm) | A (mm) | B (mm) | C (mm) | D (mm) | E (mm) | EP (mm) |
|---|---|---|---|---|---|---|---|---|
| 8.00 | 2.00 | 203.20 | 57.30 | 201.20 | 66.95 | 98.60 | 132.25 | 5.00 |
| | 1.50 | | 45.75 | | 72.73 | | 126.48 | 5.00 |
| | 1.25 | | 40.00 | | 75.60 | | 123.60 | 5.00 |
| | 1.00 | | 31.80 | | 79.70 | | 119.50 | 5.00 |
| | 3/4 | | 25.30 | | 82.95 | | 116.25 | 5.00 |
| 6.00 | 1.50 | 152.40 | 45.75 | 150.40 | 47.33 | 73.20 | 101.08 | 5.00 |
| | 1.25 | | 40.00 | | 50.20 | | 98.20 | 5.00 |
| | 1.00 | | 31.80 | | 54.30 | | 94.10 | 5.00 |
| | 3/4 | | 25.30 | | 57.55 | | 90.85 | 5.00 |
| 5.50 | 1.25 | 139.00 | 40.00 | 137.70 | 43.85 | 66.85 | 91.85 | 5.00 |
| | 1.00 | | 31.80 | | 47.95 | | 87.75 | 5.00 |
| | 3/4 | | 25.30 | | 51.20 | | 84.50 | 5.00 |
| 4.50 | 1.25 | 114.30 | 40.00 | 112.30 | 31.15 | 54.15 | 79.15 | 5.00 |
| | 1.00 | | 31.80 | | 35.25 | | 75.05 | 5.00 |
| | 3/4 | | 25.30 | | 38.50 | | 71.80 | 5.00 |
| 3.50 | 1.00 | 88.90 | 31.80 | 86.90 | 22.55 | 41.45 | 62.35 | 5.00 |
| | 3/4 | | 25.30 | | 25.80 | | 59.10 | 5.00 |

PIPE SPACER

CROSS-REFERENCE TO RELATED APPLICATIONS

This application claims priority under 35USC§119(e) of U.S. provisional patent application 61/314,224, filed on Mar. 16, 2010, the specification of which is hereby incorporated by reference.

BACKGROUND a) Field

The subject matter generally relates to geothermal vertical heat exchanger systems. More particularly, it relates to a pipe spacer for separating a U-bend pipe in a bore during installation of a pipe.

b) Related Prior Art

At this point, in the field of geothermal heat exchanger systems, a closed loop geothermal heat exchanger (GHX) is used to extract ground thermal energy. It is well known in the prior art that heat exchange occurs by the circulation of a fluid in a pipe or tube composing the closed loop. Usually, the pipe has both a supply and a return, which are normally located in the same bore hole. The supply and return pipes are connected via a "U" shape joint (U-Bend) at the bottom of a bore hole. In fact, because a vertical GHX is normally made up of High Density Polyethylene 3408 (HDPE 3408) piping, the pipe has a certain elastic flexibility thus, during the installation of a vertical geothermic exchanger, gravity tends to force the pipes to curve or bend, interlace and to lean against themselves or against the bore hole wall at their curvature or bending points. There is therefore a need in the art to provide a pipe spacer for easily separating a U-bend pipe in a bore during installation of pipe.

The scale of a geothermic field is dictated by the following elements:
1. Thermal loads to be dealt with (Building, process, etc.);
2. Underground geological conditions (soil and rock type, density, water content and average temperature);
3. Design temperature of the GHX liquid used;
4. Bore hole geometrical configuration; and
5. Pipe and grout thermal properties.

For environmental and technical reasons, it is normally necessary to fill the space around the U-Loop with a grout mixture. This grout represents an additional thermal resistance. Any grout located between the pipe and the bore hole wall causes a decrease in heat exchange which results in a decrease in the bore hole's energy efficiency and thus requiring an increase of the bore hole's length.

Interlacing, as well as the U-Loop supply and return piping proximity, contribute in reducing the geothermic exchange effectiveness (heat exchange with the ground) by increasing the thermal interference between the two pipes (supply and return) of a bore hole and by creating contact points between them, i.e. thermal energy is partially exchanged between the pipes and not entirely with the ground. Consequently, this decreases the bore hole's energy efficiency and requires an increase of its length or an increase of the number of necessary bore holes.

For a given project with specific thermal loads, at a determined site with specific geological conditions, there are few elements one can influence in order to optimize the design and the thermal effectiveness of a geothermic field. One of these elements is the pipe spacing within a bore hole.

In order to maximize heat transfer effectiveness, it is necessary to space apart as much as possible the supply pipe from the return pipe. This reduces their reciprocal thermal interference while reducing the induced grout thermal resistance.

Known in the prior art to create spacing in between pipes is U.S. Pat. No. 6,000,459, which is entitled U-BEND PIPE SPACER. This model used in North America is known under the name GeoClip™. A GeoClip™ is a spring loaded spacer. It accomplishes its task as a spacer, to maintain pipes diametrically opposed, via a spring exerting a dynamic pressure on the pipes in question, so that the GeoClip™ can push on the pipes. Because a Geoclip™ is composed of four (4) main mobile parts, two (2) retention cavities or clips to receive the pipes, one (1) spring to exert a force of repulsion and one (1) retention ring to hold the spring closed before its use, prior art spacers such as the GeoClip™ are complex to manufacture. This complexity of the prior art GeoClip™ spacer renders its utilization difficult and unpleasant. Moreover, it is characterized by its fragile nature which is inherent to its design.

It is also common to find "broken" GeoClips™ on geothermic system construction sites. Once the spring is released from one of its anchoring points, the GeoClip™ becomes useless. Although the GeoClip™ is intended to space apart u-bend pipes during installation in a geothermal system, it is very difficult to install and slows down tremendously the speed of installation of pipes which make it less interesting to handle.

Moreover, there is shown that prior art spacers often result in a significant amount of rejected, yet functional and in good condition, spacers on geothermic system construction sites. For example, from the way the pipes are connected to a GeoClip™, it happens often that one of the two pipes detaches before insertion of the GeoClip™ into the bore hole. The spring of the GeoClip™ then expands completely, thus opening the spacer. The necessary time and work to reset the spring and to reattach the GeoClip™ to the pipes is greater than the value of the GeoClip™ itself. Consequently, the worker simply tosses the GeoClip™ aside and replaces it with a new one.

On the other hand, it is also common to find prior art spacers or GeoClip™ retention rings scattered on geothermic system construction sites. These retention rings are useless and non reusable once removed from a GeoClip™. These rings, which are non biodegradable, are often found buried on the construction site, creating unwanted pollution. Existing, other spring-loaded spacer prior art comprises a metallic spring that rusts over time. This rust can lead to microbial growth. Once inside a borehole, such rust is a vector for aquifer contamination. There is therefore a need in the art to provide a simple pipe spacer device for easily separating a U-bend pipe in a bore during installation of pipe.

Additionally, due to the shape of prior art spacers such as GeoClip™, and its method of use, the bore hole must be filled with a geothermic grout at the time of the GHX insertion. The GeoClip™ retention ring is foreseen to remain in place not only until the supply and return pipes of the geothermic exchanger are connected to the GeoClip™, but also until the tremie pipe is positioned in its predefined place on the GeoClip™. The tremie pipe is used when filling the annular space between the exchanger and the bore hole wall with a geothermic grout. This pipe is connected to the GeoClip™ in a way so as to prevent the GeoClip™ spring from extending once the retention ring is removed and as long as the tremie pipe itself has not been withdrawn.

In such configurations, it is impossible to descend the tremie pipe if it is not descended at the same time as the GeoClips™. This creates a drop in bore hole drilling productivity as well as a need for expensive coordination, since the drilling and the grouting teams, which do not work at a similar pace, must however wait after each other for each bore hole. For example, drilling one bore hole typically requires 12 hours of work, while the loop insertion and bore hole grouting typically requires 4 hours of work. This adds additional costs for any installation project. Other prior art spacers such as the GeoClip™ require the use of both hands and several handling steps in order to position and connect the spacers to exchanger pipes. There is therefore a need in the art to provide a pipe spacer device for easily, and in a short period of time, separating a U-bend pipe in a bore during installation of pipe.

Finally, the complex handling requirements of prior art spacers such as the GeoClip™, in addition to the risks of their detaching from a pipe before and after their insertion in the bore hole, make prior art spacers unattractive with respect to their use with several heat exchanger installers.

Consequently, there is a need for a pipe spacer to address this requirement for reducing thermal interference while reducing induced grout thermal resistance. Moreover, there is also a need for a spacer which can improve a driller's productivity by reducing risks and facilitating installation work in general.

For all these disadvantages, there is therefore a need in the art to provide a pipe spacer for easily separating a U-bend pipe in a bore during installation of pipe, developed for use in geothermic systems using closed loop heat exchangers. More particularly, the pipe spacer will need to maintain the GHX pipes as close as possible to the bore hole wall in which the exchanger is placed. This increases the energy performance of the GHX, reduces length of pipes required and substantially reduces installation time and costs.

SUMMARY

According to an embodiment, there is provided a pipe spacer for spacing at least one pipe in a piping system, the spacer comprising:
  a handle with at least one pipe-engaging support member for maintaining an engaged pipe close to a surface in a piping system.

According to another embodiment, there is provided a pipe spacer for spacing at least two pipes in a piping system, the spacer comprising:
  a handle with at least two pipe-engaging support members for spacing engaged pipes.

The at least two pipe-engaging support members of the pipe spacer may be extending from opposite ends of the handle.

The piping system may be a heat exchanger system. In a heat exchanger system, the spacer is used to space the pipes apart from each other while maintaining them as close as possible to the bore hole wall for maximizing heat exchange.

The pipe-engaging support member may comprise a pipe-engaging clip at a free extremity of the pipe-engaging support member.

The pipe-engaging clip may comprise a concave surface for receiving a pipe.

The concave surface may be made of a substantially high friction material to reduce the slippage of the spacer on the pipe.

The pipe spacer may be sized according to a bore hole diameter.

The pipe-engaging support member may be sized according to the pipe diameter.

The handle and the pipe-engaging support members of the pipe spacer may be made of a single piece.

The handle may be made of polymeric material, plastic, ABS, metallic material or composite materials.

The pipe-engaging support member may be made of polymeric material, plastic, ABS, metallic material or composite material.

The pipe-engaging support member may be made of various radials of curvature.

The pipe spacer may have a geometry to allow slipping along a bore hole wall.

According to another embodiment, there is provided use of the pipe spacer for maintaining or spacing engaged pieces.

The pieces are selected from the group consisting of pipes, posts, sticks or pillars.

According to another embodiment, there is provided a method for spacing at least two pipes in a piping system comprising the steps of:
  a) engaging one pipe-engaging support member of the pipe spacer of claim 2 with at least a first pipe; and
  b) engaging a second pipe-engaging support members of the pipe spacer of step a) with at least a second pipe to space the first and second pipes apart in a piping system such as a heat exchanger system.

The term "spacer" is understood to include the following definition: a rigid piece connecting to two or more other pieces and maintaining a predetermined spacing between the connected pieces. Such pieces include without limitation pipes, posts, pillars, flag sticks and antennas. Preferably, the spacer is used to space apart at least two pipes in a system.

The term "heat exchanger" is understood to include the following definition: a heat exchanger system may be any device built for efficient heat transfer from one medium to another including among others a geothermal heat exchanger, including without limitation, shell and tube heat exchanger, plate fin heat exchanger, pillow plate heat exchanger, fluid heat exchanger, waste heat recovery units, dynamic scraped surface heat exchanger, phase-change heat exchanger among others Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
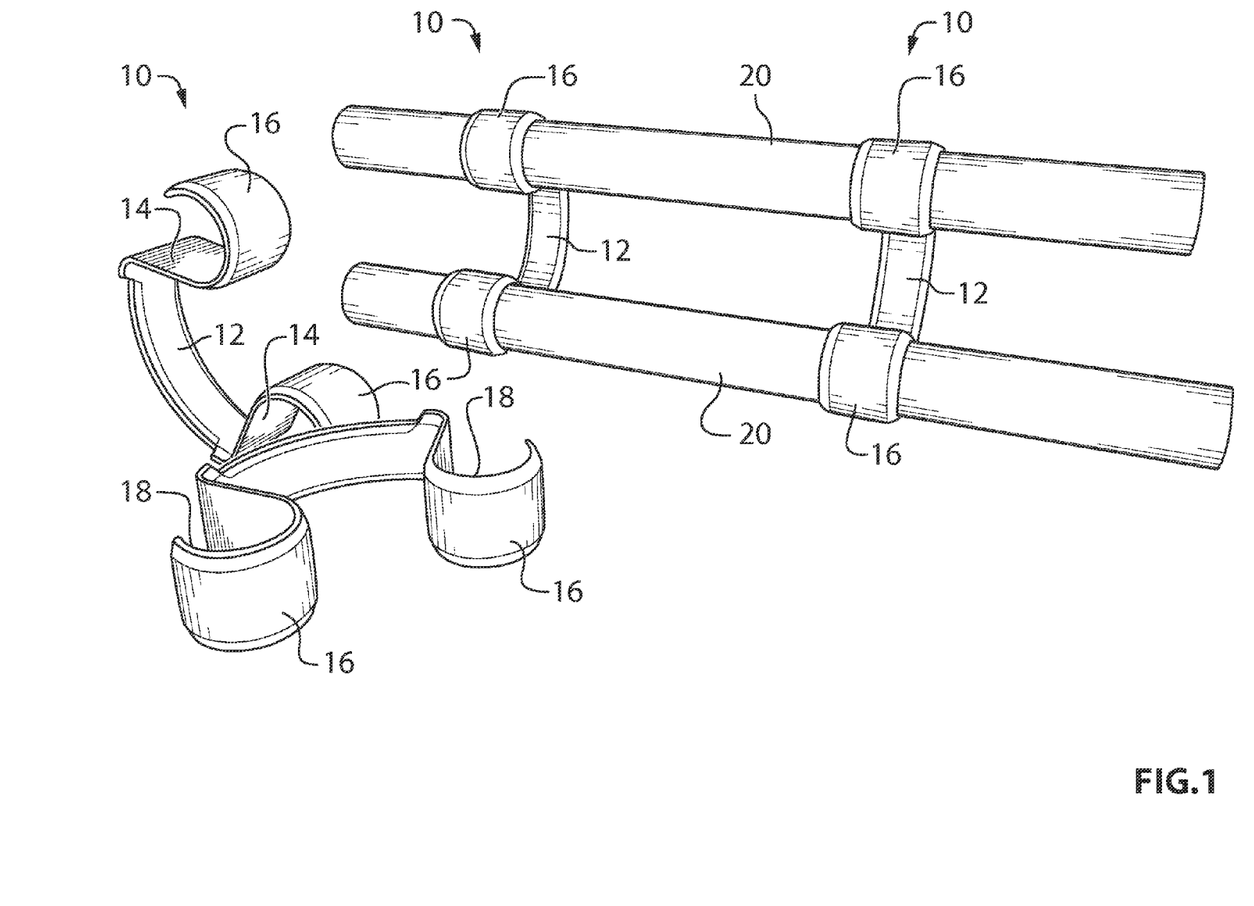
FIG. 1 is a perspective view of several spacers, including spacers installed on a pair of U-bend pipes, in accordance with an embodiment.

Referring now to the drawings, and more particularly to FIG. 1, a spacer 10 is provided for spacing a pair of pipes 20 in a heat exchanger system (for example U-bend pipes). The spacer 10 includes a handle 12 and a pair of pipe-engaging support members 14 extending from opposite ends of the handle 12. Each of the pipe-engaging support members 14 comprises a pipe-engaging clip 16 at a free extremity of the pipe-engaging support member 14, the clip 16 comprising a concave surface 18 adapted for receiving a pipe 20 therein. The handle 12 and pipe-engaging support members 14 may form a single integral component. The concave surface 18 may optionally be lined with a high friction material for use in conditions of low friction between the concave surface 18 and a pipe 20.

The spacer 10 according to one embodiment was designed for the intended use in geothermic systems using closed loop heat exchangers. More particularly, the spacer 10 is used to maintain the GHX pipes as close as possible to the bore hole wall to maximize heat exchange between the liquid circulating in the pipes 20 and the bore hole wall. This maximized heat exchange increases the energy performance of the geothermic system, reduces the length of the required pipes 20 and substantially reduces installation time and costs. On the other hand, it is to be noted that the spacer 10 may be designed for the intended use in many other heat exchanger systems such as shell and tube heat exchanger, plate fin heat exchanger, pillow plate heat exchanger, fluid heat exchanger, waste heat recovery units, dynamic scraped surface heat exchanger, phase-change heat exchanger among others.

Also, the spacer 10 may be used in multiple applications in where an adequate separation of the pipes is required. Although still in geothermal applications, there are drillers who use spacers 10 to temporarily hold the pipes 20 aligned in the horizontal portion. Other applications of the spacers 10 have no connection with geothermal energy, but with the interest of maintaining pipes aligned during installation. By example, spacers 10 may be used for maintaining in place pipes 20 in the installation of a radiant floor or of a cooling system under an ice rink. Additionally, the pacer 10 may be designed for the intended use in many other systems, even different then heat exchanger systems. By example, two spacers 10 may be used to temporarily fixe a flag on a post, or even a radio antenna on a pillar.

The spacer 10 in accordance with an embodiment, is sized according to the bore hole diameter and the geothermic exchanger pipe 20 diameter. Consequently, several spacer sizes are provided in order to address various geometrical requirements of different configurations of geothermic exchangers.

The spacer 10 does not exert pressure on the pipes 20 to separate them. The spacer 10 may accommodate various specific bore hole diameters and passively maintains spacing between the pipes 20. Additionally, the concave surface 18 of the pipe-engaging support member 14 may be made of or coated with a substantially high friction material to reduce the slippage of the spacer 10 on the pipes 20 when the exterior temperature is dropping to less than about −20° C. At these temperatures, the spacer 10 may slide more easily over the pipes 20 and moves when the pipes 20 are going down in the bore hole. In fact, the substantially high friction material of the concave surface 18 of the pipe-engaging support member 14 improves the friction level between the pipes 20 and the spacer 10 and reduces the slippage effect of the spacer 10 in those conditions. It is also to be noted that it is not essential to provide the concave surface 18 of the pipe-engaging support member 14 with a substantially high friction material all year long. The rigidity of the spacer 10 maintains the distance between the pipes 20. However, the spacer 10 also has a certain level of resilience enabling it to adapt to occasional geothermic anomalies of a bore hole.

The spacer 10 may be made of a single piece. When the spacer 10 is composed of a single non-corrodible or corrosion proofed piece, no discarded material is produced and left on the construction site. Moreover, the spacer may be made of recycled ABS, thereby helping preserve the environment. The shape and design of the spacer 10 are carefully developed in order to meet solidity, durability and handiness requirements. The material used to manufacture the spacer 10 may be a rigid material and may be a resistant material for repetitive handlings. The spacer 10 maintains its integrity, even when subjected to rough construction site conditions.

It is to be noted that the spacer 10 is not necessarily made of a single portion. The spacer 10 may be designed as a two piece unit that can be assembled after production in such a way that it maintains the original rigidity and flexibility of the spacer 10. One pipe-engaging support member 14 would be able to slide completely into the other pipe-engaging support member 14 to complete the full spacer 10. Assembled prior to shipping, the spacer 10 in its final unit would not be made of a single piece.

The shape of the spacer 10 is designed to hold the pipes 20 in place no matter what occurs during descent in the bore hole. In the event, due to mishandling by the driller for example, that a pipe 20 is detached from a spacer 10, prior to insertion into the bore hole, the spacer 10 remains in place and the pipe 20 can easily be reconnected. Moreover, the edges of the spacer 10 have a geometry that allows slippage along the bore hole wall. Even if there is friction throughout insertion of the pipe, which is possible, the spacer 10 is designed to preserve its integrity throughout the descent and until it is placed in its final position. By the way of the spacer's 10 "Omega" shape, if a pipe 20 detaches from its retention cavity, it will nevertheless remain in place between the spacer 10 and the bore hole wall.

According to an embodiment, use of a spacer 10 does not require a tremie pipe to be present during its insertion into the bore hole and consequently does not encumber a tremie pipe descent. Productivity at the time of installation is maintained without any modifications to typical working methods for geothermic installations.

The spacer 10 is designed to maximize the open access space in a bore hole, in order to allow for GHX insertion without the presence of a tremie pipe. GHX insertion can be completed several days and even weeks, prior to grouting the bore hole with a geothermic grout. Furthermore, the tremie pipe will face little, if any, interference during the descent. It is therefore possible for the driller to insert the geothermic exchanger into the bore hole as early as possible, independently of grouting equipment, and this while reducing economic costs due to on site equipment being on standby. The distinctive shape of the spacer 10 may allow the tremie pipe to slip along the spacer rather than to hook onto it.

Figure 2A:
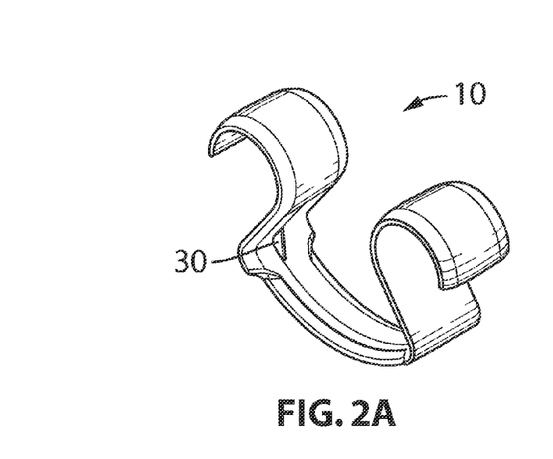
FIG. 2A is a perspective view of a spacer in accordance with another embodiment.
Figure 2B:
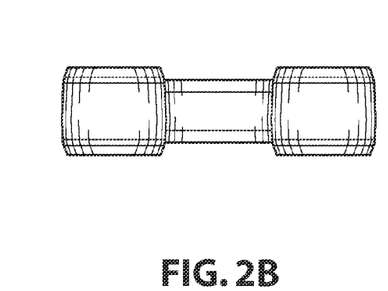
FIG. 2B is a top plan view of a spacer in accordance with another embodiment.
Figure 2C:
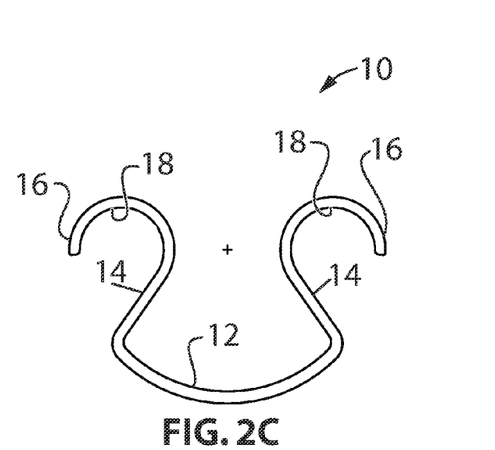
FIG. 2C is a front view of a spacer in accordance with another embodiment.
Figures 2D, 2E:
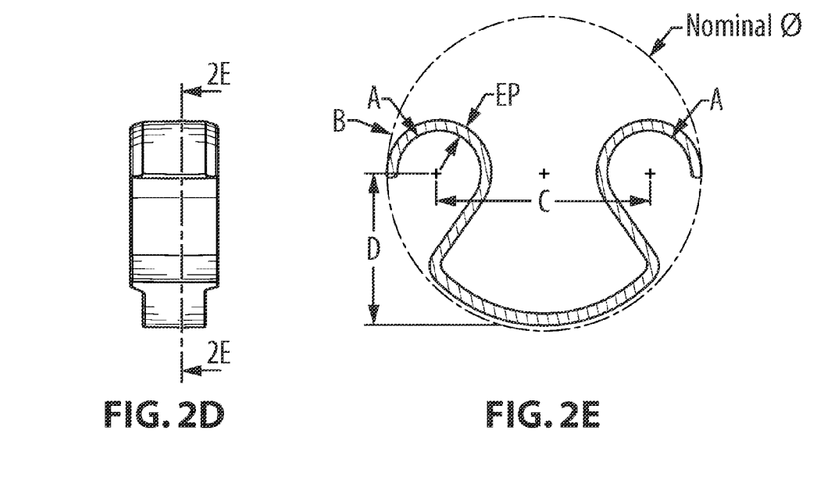
FIG. 2D is a side view of a spacer in accordance with another embodiment.
FIG. 2E is a cross-sectional view along axis A-A of FIG. 2D of a spacer in accordance with another embodiment.
Figure 3:
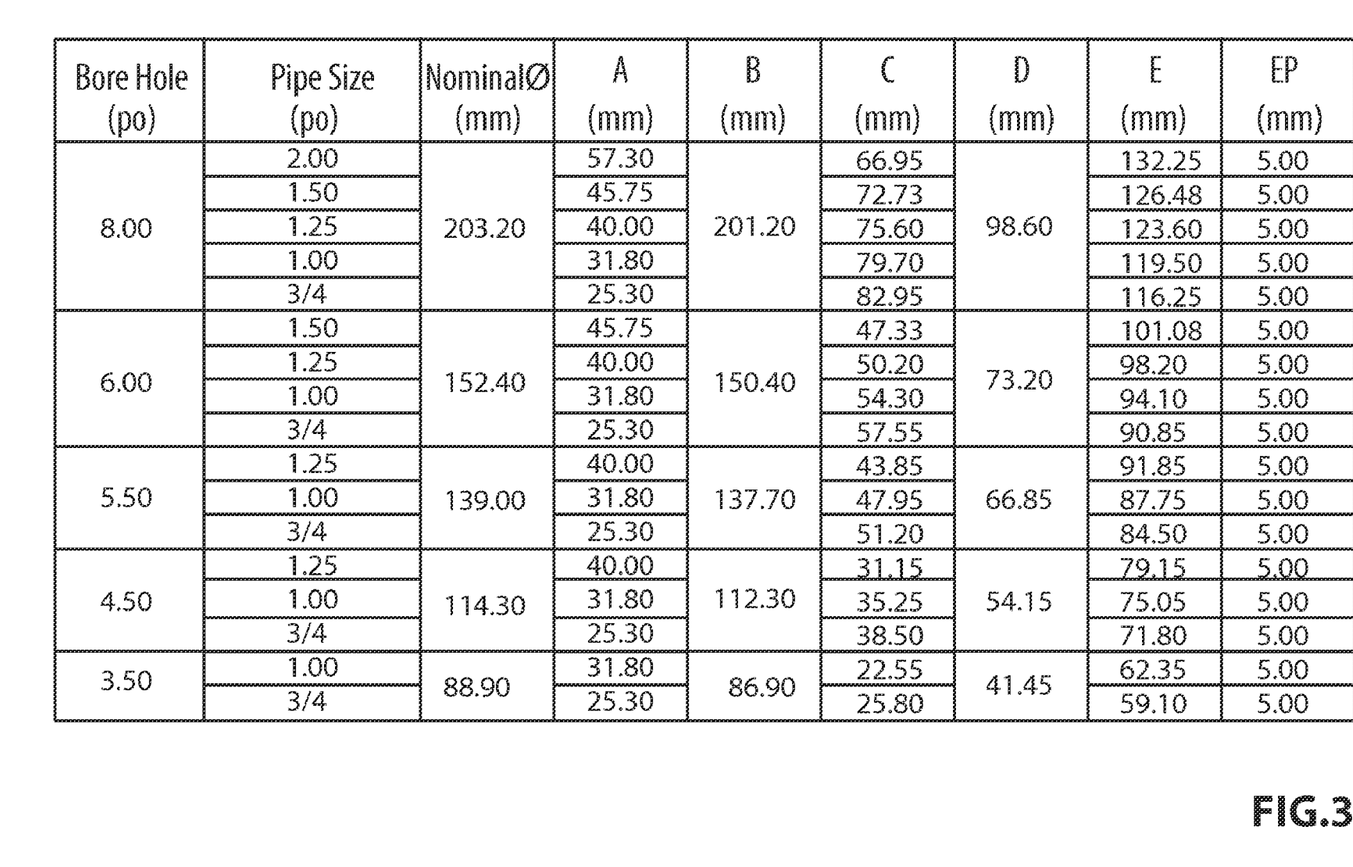
FIG. 3 is a table specifying different dimensions required for an array of, but not limited to, different possibilities of installation applications of the spacer with respect to the dimensions shown in FIGS. 2A to 2E.
Figure 4A:
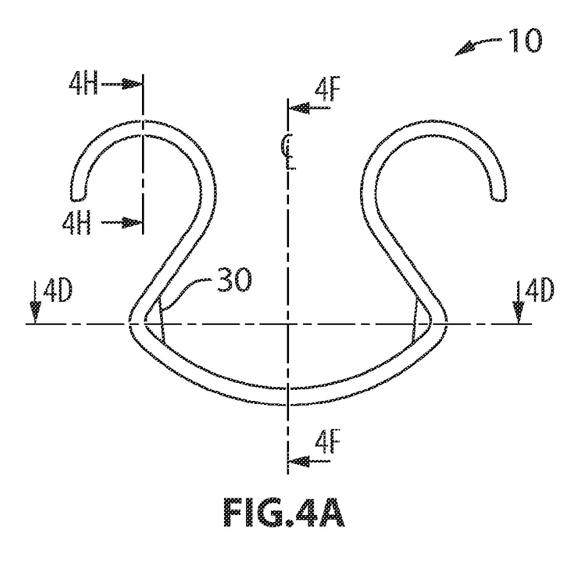
FIG. 4A is a front view of a spacer in accordance with another embodiment.
Figure 4B:
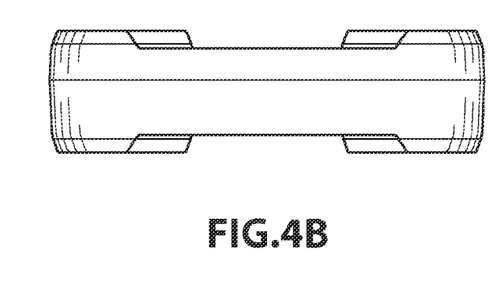
FIG. 4B is a top plan view of a spacer in accordance with another embodiment.
Figure 4C:
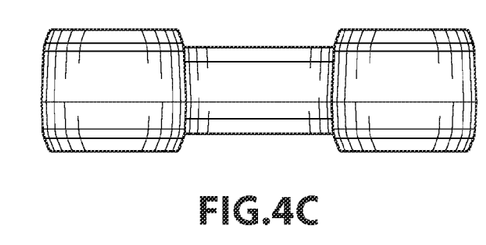
FIG. 4C is a bottom plan view of a spacer in accordance with another embodiment.
Figure 4D:
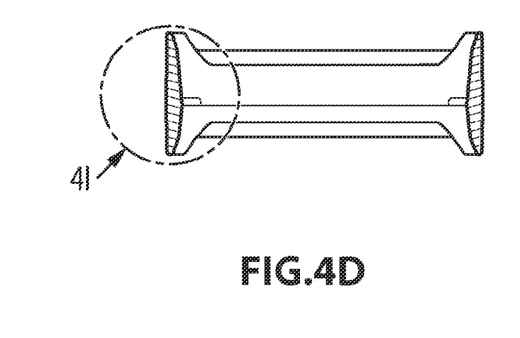
FIG. 4D is a bottom plan view along axis D-D of FIG. 4A of a spacer in accordance with another embodiment.
Figure 4E:
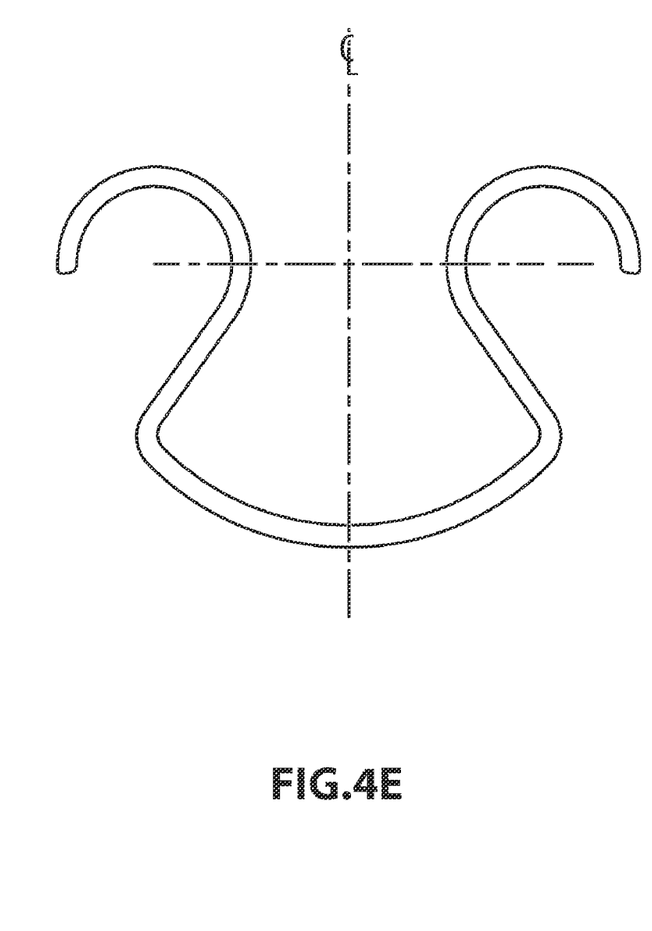
FIG. 4E is a cross-sectional view along axis A-A of FIG. 4G of a spacer in accordance with another embodiment.
Figure 4F:
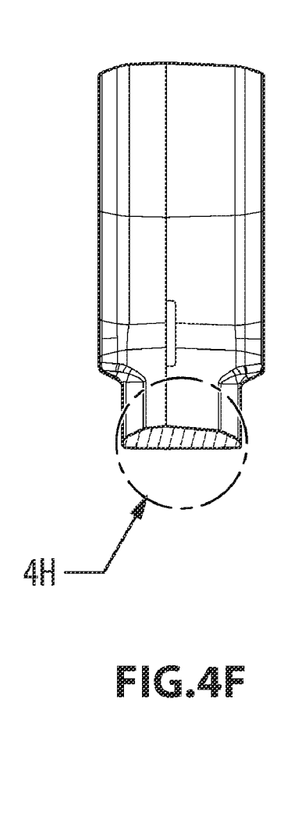
FIG. 4F is a cross-sectional view along axis B-B of FIG. 4A of a spacer in accordance with another embodiment.
Figure 4G:
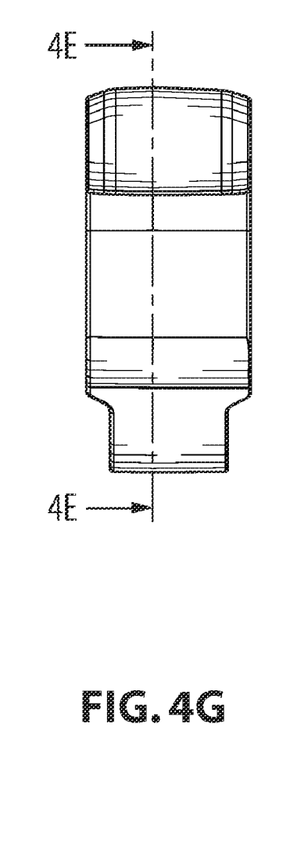
FIG. 4G is a side view of a spacer in accordance with another embodiment.
Figure 4H:
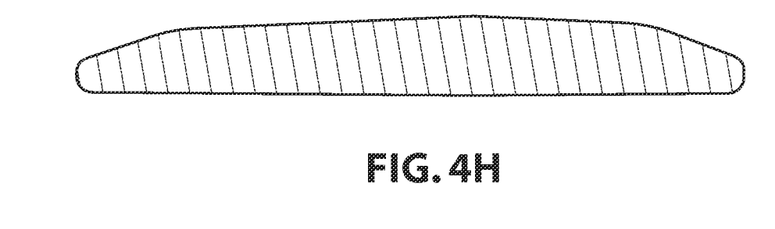
FIG. 4H is a view along axis C-C of a spacer in accordance with another embodiment.
Figure 4I:
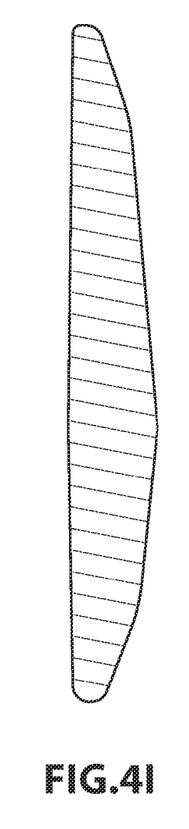
FIGS. 4I and 4J illustrate that the thickness of the central portion of the spacer remains the same whereas the width varies.
Figure 4J:
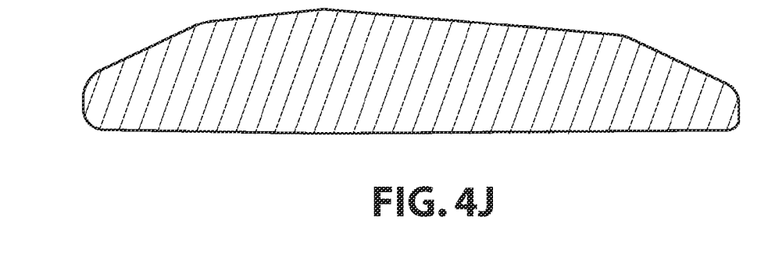

Referring now to FIGS. 2A to 4J, there is shown that, preferably, during manufacturing of the spacer 10, a tab element 30 (as shown in FIG. 2A) may be added to the design of the spacer 10 in order to keep the spacer 10 from folding on itself during cooling of the part. Indeed, during the cooling phase of the spacer 10 during manufacturing thereof, the materials used to make the spacer 10 contract and sometimes the spacer 10 closes on itself more than desired, at the corners between the handle 12 and the pipe-engaging support members 14. The tab 30 cools down more quickly than the remainder of the spacer parts 12, 14 and therefore keeps the corners from folding excessively. If desired, the tab 30 can be cut from the part after production of the spacer 10 as it is only useful during manufacturing thereof. This tab may not be required for other types of materials used to make the spacer 10.

Moreover, the pipe spacer 10 may be used for spacing only one pipe 20 from a particular surface in a piping system. In this case, the spacer 10 is made of a handle 12 and only one pipe-engaging support member 14 extending from one end of the handle 12, in which the pipe-engaging support member 14 is for spacing an engaged pipe 20.

Figure 5A:
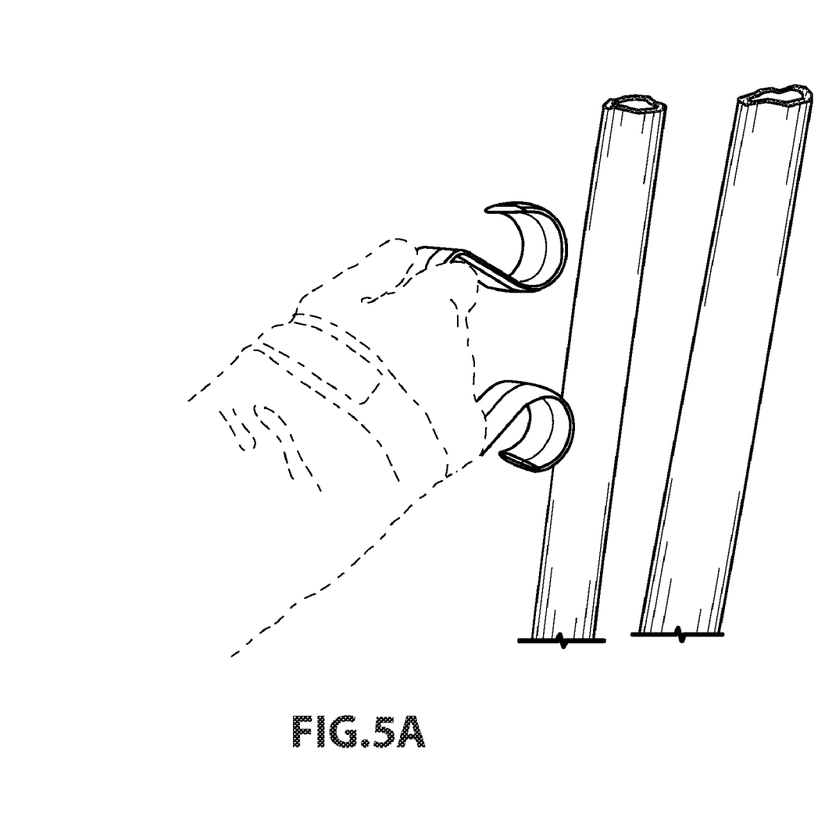
FIGS. 5A to 5G are perspective views illustrating the installation steps of a spacer on a U-bend pipe for eventual installation in a bore in the ground in accordance with an embodiment.
Figure 5B:
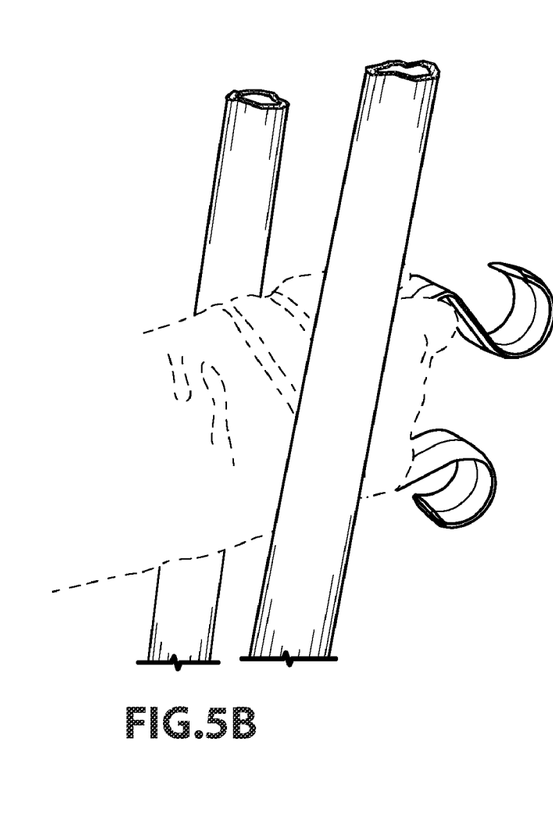
Figure 5C:
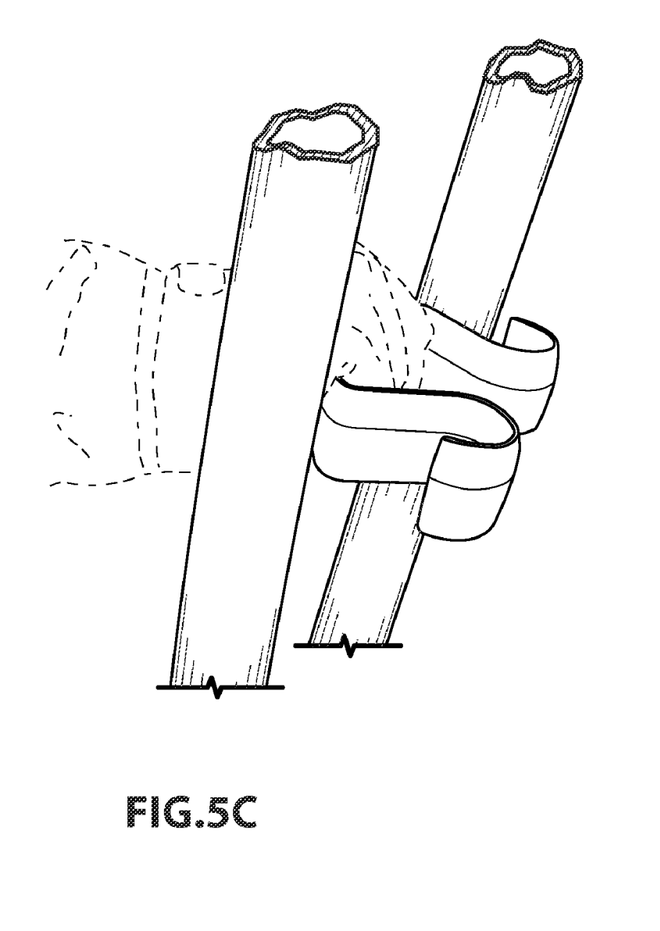
Figure 5D:
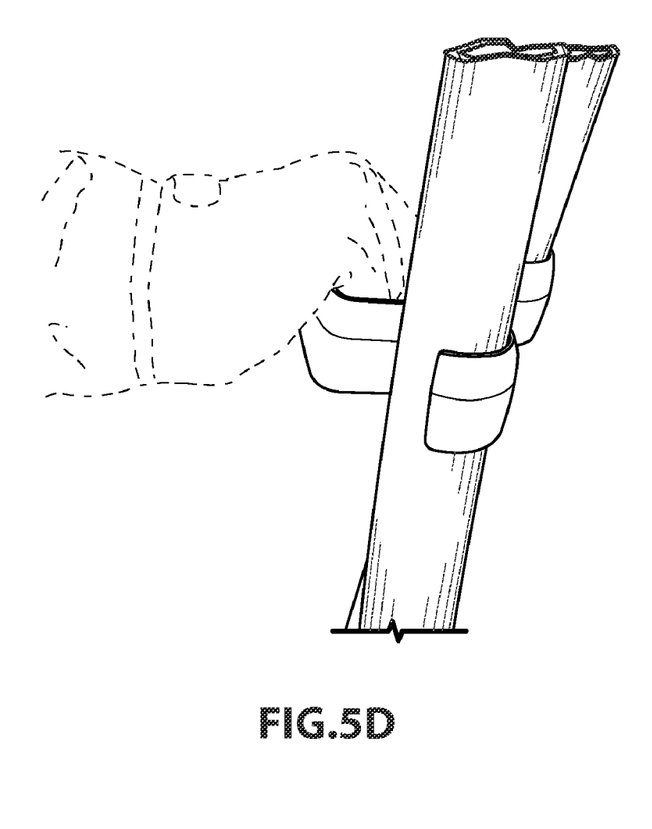
Figure 5E:
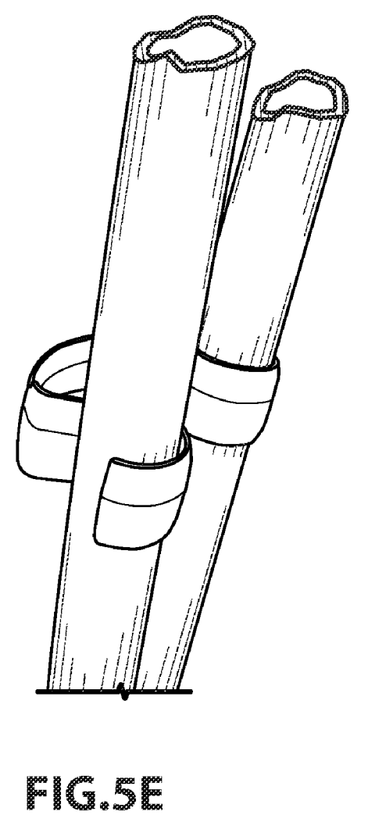
Figure 5F:
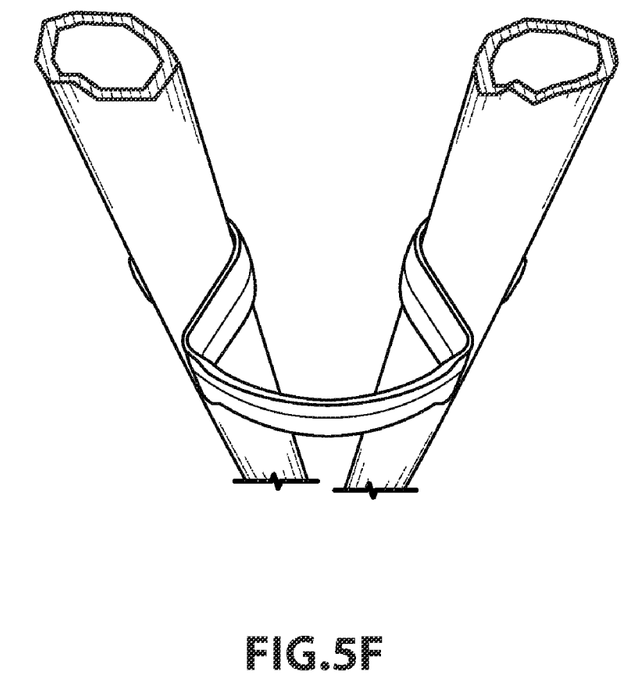
Figure 5G:
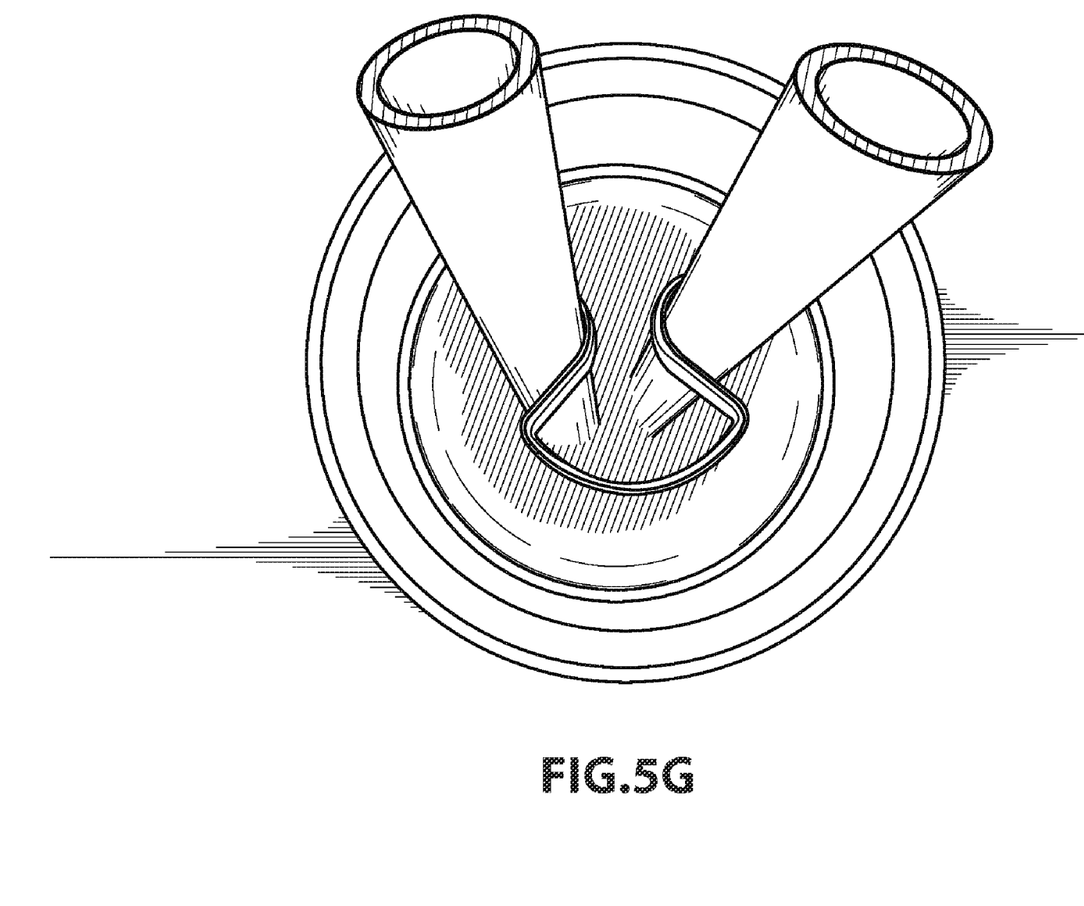

As better shown in FIGS. 5A to 5G, handling of the EZ-SNAPS™ spacer 10, in order to connect it to the GHX pipes 20, is accomplished in a single gesture. A worker can position a spacer (FIG. 5C) and, in one jerking movement, snap it into place (FIG. 5D). There are no additional parts requiring removal in order to actuate the spacer, no spring and no moving parts. No extra parts of the spacer can dislodge or fall. As shown in FIGS. 5A to 5G, connection of the spacer 10 to the exchanger pipes 20 can be accomplished with the use of a single hand.

For environmental and technical reasons, it is normally necessary to fill the space around the U-Loop with a grout mixture. This grout represents an additional thermal resistance. Any grout located between the pipe and the bore hole wall causes a decrease in heat exchange which results in a decrease in the bore hole's energy efficiency and thus requiring an increase of the bore hole's length. Interlacing, as well as the U-Loop supply and return piping proximity, contribute in reducing the geothermic exchange effectiveness (heat exchange with the ground) by increasing the thermal interference between the two pipes (supply and return) of a bore hole and by creating contact points between them, i.e. thermal energy is partially exchanged between the pipes and not entirely with the ground. Consequently, this decreases the bore hole's energy efficiency and requires an increase of its length or an increase of the number of necessary bore holes.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A substantially omega shaped resilient pipe spacer for spacing two pipes in a piping system, said spacer comprising:
   a handle, forming a substantially convex surface configured to abut a circumferential surface of a bore hole and adapt to anomalies of said circumferential surface of a bore hole;
   two linear support members, connected substantially perpendicularly to opposite terminal ends of said handle at a first extremity of each said linear pipe support member and extending inwardly, toward each other from opposite ends of said handle, and forming a gap without contact between said linear pipe support members, said two linear support members being substantially coplanar with said handle and each linear pipe support member having a pipe-engaging clip extending from a second extremity of each said linear pipe support member, each said pipe-engaging clip forming a concave surface with a continuous radius of curvature configured for engaging one pipe;
   wherein said handle, said two linear pipe support members, and said pipe-engaging clips are of unitary construction and together form an omega shape configured to maintain engaged pipes close to said circumferential surface of a substantially circular bore hole in a piping system for maximizing heat exchange between a liquid in said engaged pipes and said circumferential surface, wherein said spacer is sized according to the substantially circular bore hole diameter so that the handle and the pipe engaging clips can simultaneously contact the circumferential surface of the bore hole, wherein said handle and said two linear pipe support members are configured to retain a disengaged pipe between the spacer and said circumferential surface of the substantially circular bore hole, and wherein said handle and said two linear pipe support members define an open access space for passage of another pipe independently and without interference with said pipe spacer after said engaged pipes and said pipe spacer have been lowered into said bore hole.

2. The pipe spacer of claim 1, wherein said piping system is a heat exchanger system.

3. The pipe spacer of claim 1, wherein said pipe support members are sized according to the diameter of said pipes.

4. The pipe spacer of claim 1, wherein the spacer is made of polymeric material, plastic, ABS, metallic material or composite materials.

5. The pipe spacer of claim 1, wherein an exterior surface of the pipe-engaging clips comprise a convex surface to allow slipping along the circumferential surface of the bore hole.

6. The pipe spacer of claim 1, wherein said concave surface is made of a high friction material to reduce slippage of the spacer on the pipes.

7. The pipe spacer of claim 1, wherein said other pipe is a tremie pipe.

8. A method for spacing two pipes in a piping system comprising the steps of:
   a) engaging at least a first pipe on a substantially omega shaped resilient spacer comprising:

a handle, forming a substantially convex surface configured to abut a circumferential surface of a bore hole and adapt to anomalies of said circumferential surface of a bore hole;

two linear support members, connected substantially perpendicularly to opposite terminal ends of said handle at a first extremity of each said linear pipe support member and extending inwardly, toward each other from opposite ends of said handle, and forming a gap without contact between said linear pipe support members, said two linear support members being substantially coplanar with said handle and each linear pipe support member having a pipe-engaging clip extending from a second extremity of each said linear pipe support member, each said pipe-engaging clip forming a concave surface with a continuous radius of curvature configured for engaging one pipe;

wherein said handle, said two linear pipe support members, and said pipe-engaging clips are of unitary construction and together form an omega shape configured to maintain engaged pipes close to said circumferential surface of a substantially circular bore hole in a piping system for maximizing heat exchange between a liquid in said engaged pipes and said circumferential surface, wherein said spacer is sized according to the substantially circular bore hole diameter so that the handle and the pipe engaging clips can simultaneously contact the circumferential surface of the bore hole, wherein said handle and said two linear pipe support members are configured to retain a disengaged pipe between the spacer and said circumferential surface of the substantially circular bore hole, and wherein said handle and said two linear pipe support members define an open access space for passage of another pipe independently and without interference with said pipe spacer after said engaged pipes and said pipe spacer have been lowered into said bore hole; and b) engaging a second pipe on said pipe spacer of step a) to space said first and second pipes apart in a piping system.

9. The method of claim 8, wherein said piping system is a heat exchanger system.

10. A method for spacing apart two substantially parallel pipes in a piping system comprising the steps of:

a) inserting between the two substantially parallel pipes a substantially omega shaped resilient spacer comprising:

a handle, forming a substantially convex surface configured to abut a circumferential surface of a bore hole and adapt to anomalies of said circumferential surface of a bore hole;

two linear support members, connected substantially perpendicularly to opposite terminal ends of said handle at a first extremity of each said linear pipe support member and extending inwardly, toward each other from opposite ends of said handle, and forming a gap without contact between said linear pipe support members, said two linear support members being substantially coplanar with said handle and each linear pipe support member having a pipe-engaging clip extending from a second extremity of each said linear pipe support member, each said pipe-engaging clip forming a concave surface with a continuous radius of curvature configured for engaging one pipe;

wherein said handle, said two linear pipe support members, and said pipe-engaging clips are of unitary construction and together form an omega shape configured to maintain engaged pipes close to said circumferential surface of a substantially circular bore hole in a piping system for maximizing heat exchange between a liquid in said engaged pipes and said circumferential surface, wherein said spacer is sized according to the substantially circular bore hole diameter so that the handle and the pipe engaging clips can simultaneously contact the circumferential surface of the bore hole, wherein said handle and said two linear pipe support members are configured to retain a disengaged pipe between the spacer and said circumferential surface of the substantially circular bore hole, and wherein said handle and said two linear pipe support members define an open access space for passage of another pipe independently and without interference with said pipe spacer after said engaged pipes and said pipe spacer have been lowered into said bore hole; and b) positioning said spacer to a position substantially perpendicular to said two substantially parallel pipes and snapping in a single jerking movement a corresponding pipe-engaging clip of said spacer onto a corresponding pipe to install the spacer on said two pipes.

\* \* \* \* \*